F. D. WEEKS.
CALCINING, DESULFURIZING, AGGLOMERATING, AND SINTERING ORES AND THE LIKE.
APPLICATION FILED APR. 18, 1908.

916,903.

Patented Mar. 30, 1909.
9 SHEETS—SHEET 1.

Fig. 1.

WITNESSES:

INVENTOR:
Francis D. Weeks,
BY
ATTORNEYS.

F. D. WEEKS.
CALCINING, DESULFURIZING, AGGLOMERATING, AND SINTERING ORES AND THE LIKE.
APPLICATION FILED APR. 18, 1908.

916,903.

Patented Mar. 30, 1909.
2 SHEETS—SHEET 2.

WITNESSES:

INVENTOR:
Francis D. Weeks,
BY
ATTORNEYS

F. D. WEEKS.
CALCINING, DESULFURIZING, AGGLOMERATING, AND SINTERING ORES AND THE LIKE.
APPLICATION FILED APR. 18, 1908.

916,903.

Patented Mar. 30, 1909.

F. D. WEEKS.
CALCINING, DESULFURIZING, AGGLOMERATING, AND SINTERING ORES AND THE LIKE.
APPLICATION FILED APR. 18, 1908.

916,903.

Patented Mar. 30, 1909.

F. D. WEEKS.
CALCINING, DESULFURIZING, AGGLOMERATING, AND SINTERING ORES AND THE LIKE.
APPLICATION FILED APR. 18, 1908.

916,903.

Patented Mar. 30, 1909.
9 SHEETS—SHEET 8.

UNITED STATES PATENT OFFICE.

FRANCIS D. WEEKS, OF SALIDA, COLORADO, ASSIGNOR TO OHIO AND COLORADO SMELTING AND REFINING COMPANY, OF NEW YORK, N. Y., A CORPORATION OF COLORADO.

CALCINING, DESULFURIZING, AGGLOMERATING, AND SINTERING ORES AND THE LIKE.

No. 916,903.   Specification of Letters Patent.   Patented March 30, 1909.

Application filed April 18, 1908.   Serial No. 427,773.   REISSUED

*To all whom it may concern:*

Be it known that I, FRANCIS D. WEEKS, a citizen of the United States, residing at Salida, in the county of Chaffee and State of Colorado, have invented certain new and useful Improvements in Calcining, Desulfurizing, Agglomerating, and Sintering Ores and Like Materials; and I do hereby declare the following to be a full, clear, and exact description of the invention, such as will enable others skilled in the art to which it appertains to make and use the same.

Prior to my present invention, it has been proposed to effect the calcining, desulfurizing, agglomerating or sintering of ores and like materials by imparting to the latter a motion of bodily transition, in a rectilinear or in a circular path, while, at the same time, forcing or drawing air through the ore or the like, until the desired calcined, roasted or agglomerated and sintered product was obtained, suitable for use in the smelting furnace. To this end, the ore or like material to be treated has been placed upon a perforated or grated bottom to which motion was imparted in either a rectilinear or a rotary horizontal plane, and means were provided for feeding a continuous supply of the material to maintain the advancing and constantly moving body undergoing treatment, while, at the same time, the completed or fully roasted, calcined or agglomerated portions meeting, in their outward course, a stationary diverting scraper or scrapers passed off into appropriate collecting bins or receptacles. At the same time, a downward draft of air through the material served to maintain the necessary combustion and the gaseous products resulting therefrom were conveyed away by appropriate flues. Serious objections exist to the satisfactory realization in practice of this particular manner of calcining, roasting, and agglomerating or sintering ores. In the first place, it is desirable that the mass of ore after it has been ignited and is being subjected to the action of the air current, should be quiescent, in order to utilize to the best advantage the sintering effect of the combustion. Furthermore, the bodily transfer of a mass of ore in a state of active combustion is a very considerable tax upon the capabilities of the furnace structure as a whole, especially in view of the inevitable warping and distortion, (under the influence of the intense heat) of the moving grate surface and its accessories, thereby resulting in unevenness of the operation, leakages, the necessity of frequent interruptions and repairs, excessive demands upon the motive power required for driving the grate, and the like. By my present invention, I entirely avoid these disadvantages. Primarily, I entirely suppress and avoid any bodily movement of the ore or like material to be treated, from the time that it is deposited upon the perforated or grated surface and is ignited and burned thereon up to the time when it is ready for discharge from the apparatus as the finished product thereof, at the termination of the calcining, roasting, agglomerating or sintering action. The ore, or the like, therefore remains entirely quiescent during this full period, and, receives to the best advantage the effect of the air current. Instead of being moved bodily, together with the heavy grate which supports it, the ore and the grate surface remains fixed, thereby reducing to the minimum the disadvantage due to any overheating or warping of the grate surface or its immediate accessories. Furthermore, the ore or like material is fed to the stationary grate surface from a hopper which may conveniently be of such small carrying capacity as to impose upon the mechanism for moving it, but a fraction of the weight of the ore on the grate surface and which may itself be supplied at any desired intervals during its travel, so that, at no time, it may overload the moderate motor mechanism required for progressing it.

In the accompanying drawings, I have illustrated several modifications of apparatus adapted for the practice of my invention, and embodying its fundamental features.

Similar letters of reference indicate similar parts throughout the several views.

Referring first to Figs. 1, 2, 3, 4 and 5 of the drawings, A indicates a furnace structure provided with a two-part annular gallery, the upper part $a$ being separated from the lower part $b$ by means of an annular arch $c$. The upper gallery portion $a$ is preferably provided with a series of radial partitions $d$ dividing it up into individual compartments which communicate with the lower portion $b$ of the gallery through the intermediacy of movable valves $e$. These valves are provided with actuating valve stems $d'$ whose inner ends project into an open well space B central of the furnace structure, and are there provided with actuating arms $a'$, adapted to be automatically actuated to partially open or to permit the closing or partial closing of the valves, as and for the purposes hereinafter described. Above the portion $a$ of the gallery is located the stationary annular grate $f$, resting firmly upon the walls of the stationary furnace structure A and making a tight fit therewith, so as to prevent the drawing in of air except through the grate openings themselves. An annular flange or guard $f'$ is provided along the inner edge of the annular grate, but at its outer periphery, the grate $f$ is preferably devoid any such upward projection, so as to be free to permit the discharge of the completed product into the bins, cars or other receptacles intended for its collection. The portion $b$ of the gallery below the arch $c$ connects with any suitable blast device (should it be desired to force a current of air upwardly through the body of ore on the grate surface), or with an exhaust fan, chimney stack, or the like, when, as is preferable, the air is to be drawn downward through the mass of ore. This portion $b$ of the gallery is continuous and devoid of partitions, and it exerts either a plenum or an exhausting action upon all of the upper compartments $a$ that are in communication therewith, and to an extent determined upon the location of their several valves. In the central well B is located a stationary column C which supports the revolving shell D. The gear $e'$ fixed upon the lower end of the shell D may be rotated by means of the gear $b'$ upon the power shaft E. The revolving shell D is provided with the spider F which carries the annular trackway or camway $e'$, of the configuration illustrated more fully in Fig. 5, the arrangement of the parts being such that the trackway or camway $e'$ will act upon the arms $a'$ of the rotatory stems $d'$ of the valves $e$ successively, in such manner as to open them more or less, as predetermined, to suit the particular requirements of draft of the ore during its several stages of combustion.

Figure 1:
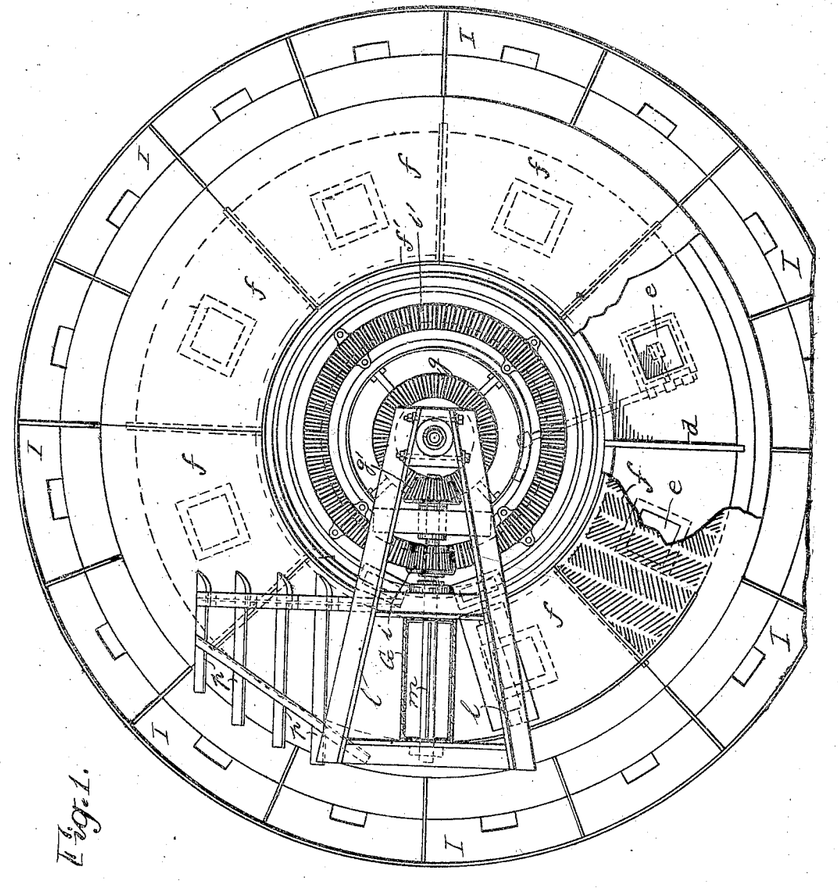
Figure 1 represents a top plan view, partly broken away, of one form or modification of the invention.
Figure 2:
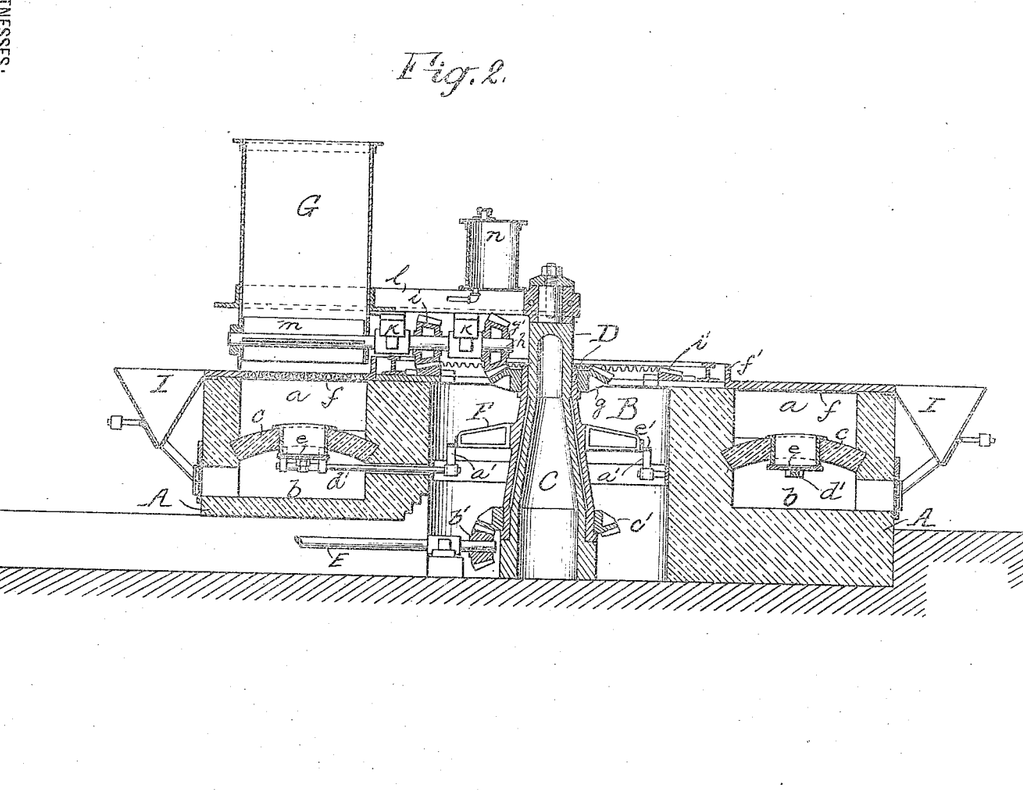
Fig. 2 represents a central vertical sectional view thereof.

The upper portion of the rotatory shell D carries the gear $g$ which meshes with the gear $g'$ fast upon the shaft $h$. The shaft $h$ is preferably provided with another gear $i$ running upon a stationary annular track gear $i'$, and which is designed to assist in supporting and bearing the weight of the revolving parts. The shaft $h$ is carried in bearings $k$ depending from a frame $l$ extending radially from the central column C upon which it is mounted to rotate freely. The frame $l$, made up of the radial pieces and cross pieces shown, likewise carries the feed hopper G for the ores to be treated, and, in the bottom of the feed hopper is located the flutter wheel $m$ mounted upon the shaft $h$ and adapted to feed a predetermined and regulated quantity of ore upon the stationary grate surface, as the frame $l$ and the hopper G advance. On one side of the discharge opening of the hopper is located the burner H, which I have indicated conventionally and which may be supplied with oil, compressed gas or like fuel from a supply tank $n$ carried by the frame $l$. On the opposite side of the hopper are located the plow point scrapers $p$, inclined or stepped, as shown, so as to divide between them the function of diverting the completed product from the stationary grate. Finally the entire furnace structure A is encircled by an annular receiving hopper I provided with weighted discharge gates, as shown. This annular receiving hopper may itself be conveniently divided up into appropriate compartments, if desired, and is adapted to discharge its contents, either automatically or otherwise at intervals, into receiving cars or the like.

The mode of operation of this modification of my invention will be apparent. The ore or other material to be calcined, roasted, desulfurized, agglomerated or sintered, is fed in regulated quantity, determined by the flutter wheel or feed wheel $m$, upon the stationary grate surface, as the feed hopper itself is revolved in the direction indicated by the arrow in Fig. 1. The revolution of the feed hopper is sufficiently slow to permit the gas or oil burner H to fully ignite the ore as it is discharged from the hopper, whereupon the body of air, drawn down through the ore, progressively completes its combustion. It is intended, in the usual operation of the apparatus, that by the time the feed hopper shall have completed or substantially completed an entire revolution about its supporting axis, the portion of the ore first ignited shall have become sufficiently calcined, roasted, agglomerated or sintered to subserve the purposes intended, and, accordingly, at this period, it is ready to be discharged from the grate surface into the receiving bin I, which operation is effected by the inclined and stepped scrapers p. During the progress of the feed hopper, the valves e are appropriately operated, should they be employed at all, which is not always the case, and, if employed, they may be operated either automatically by the cam track e', or by hand, as may prove more convenient and effective.

Figure 6:
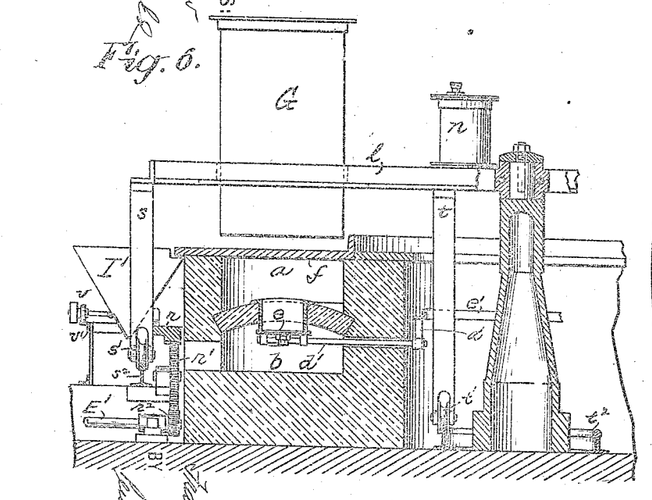
Figs. 6 and 7 represent, respectively, a vertical section and a plan view of a modified form of the apparatus.
Figure 7:
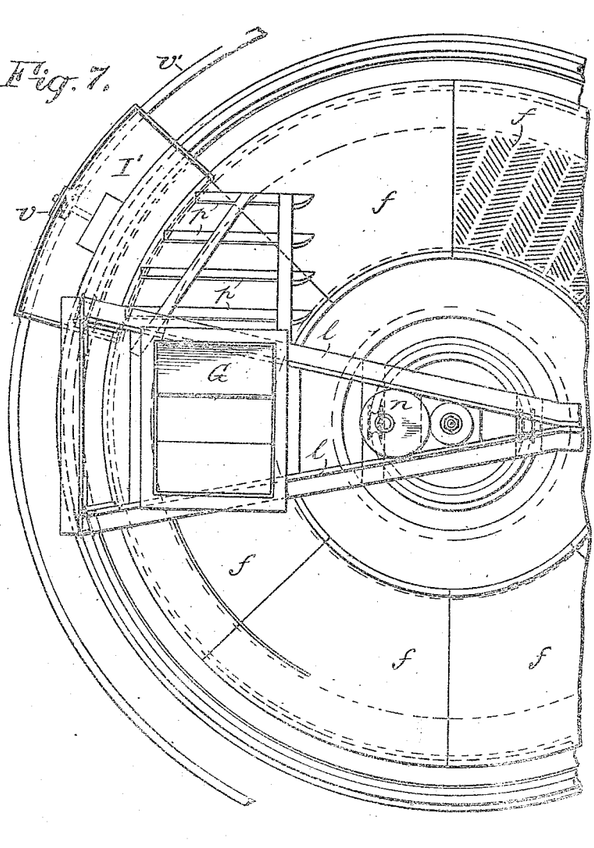
Figure 8:
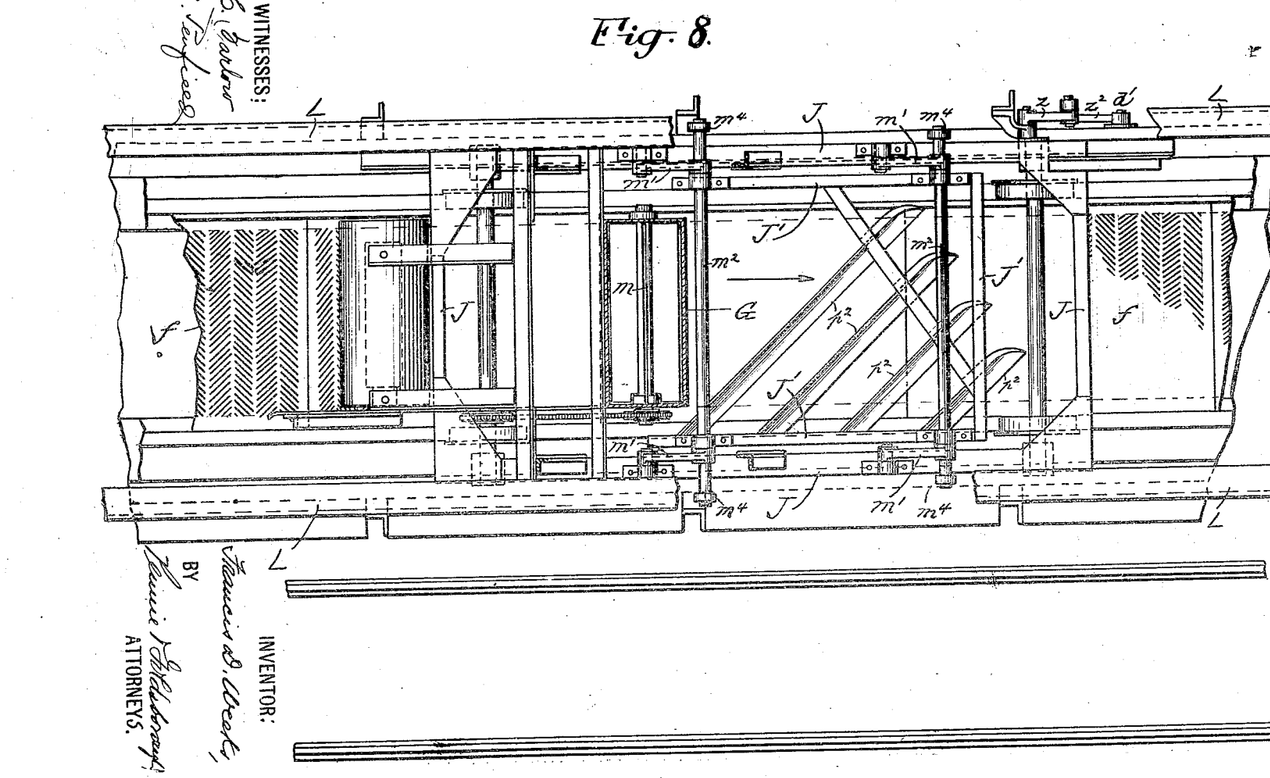
Fig. 8 represents a fractional view, partly in plan and partly in section, of another modification of my invention.
Figure 9:
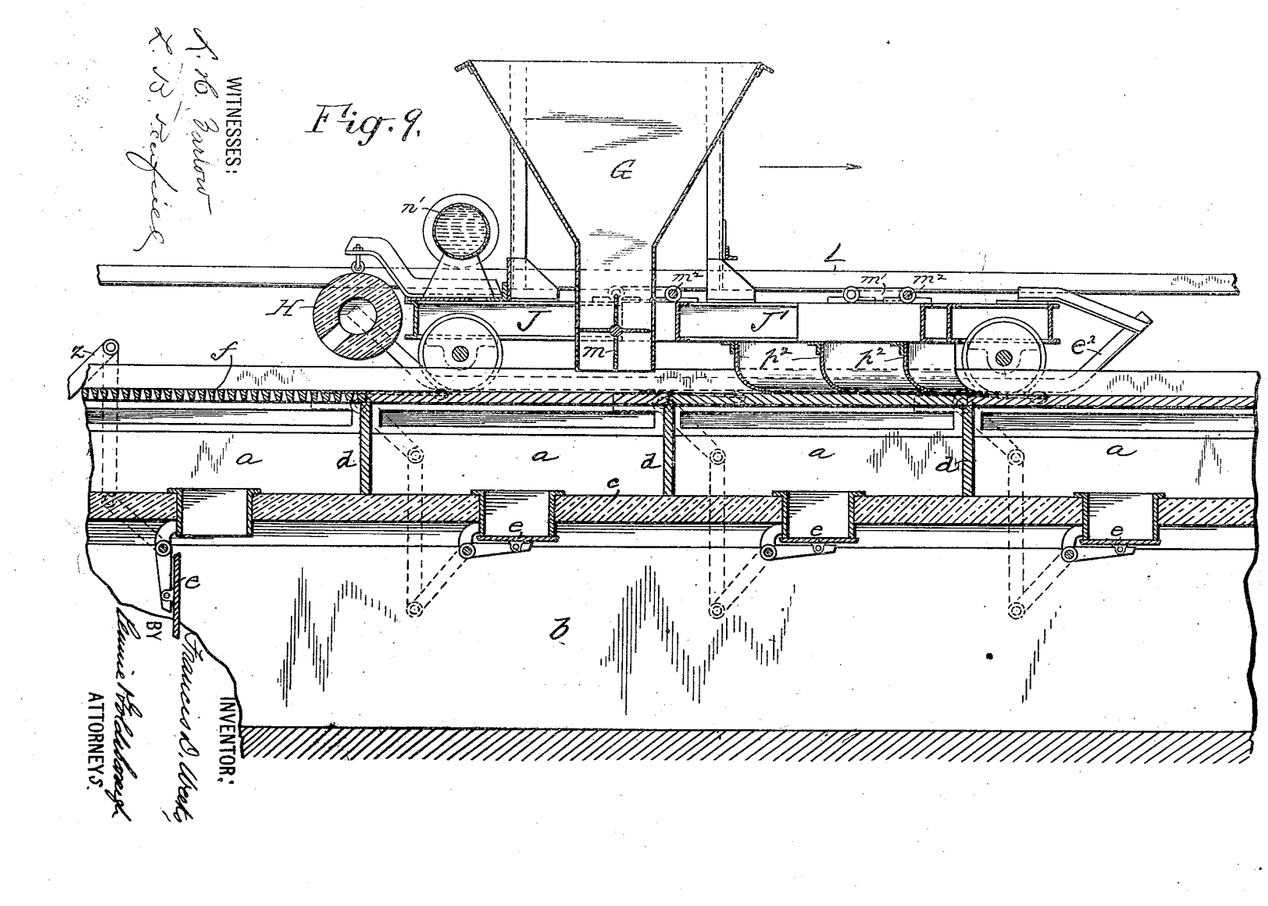
Fig. 9 represents a longitudinal vertical section thereof.
Figures 10, 11:
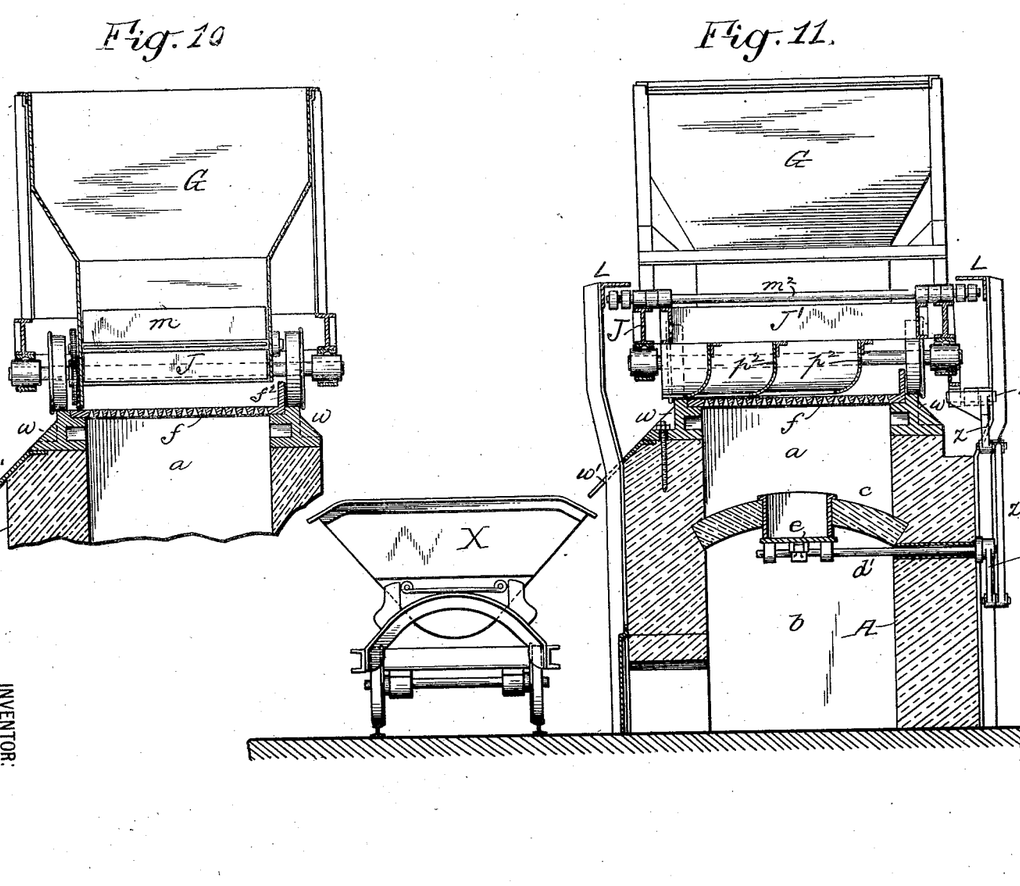
Figs. 10 and 11 represent respectively a vertical sectional view taken through the feed hopper, and a vertical sectional view taken immediately in advance thereof toward the discharge end of the apparatus.
Figure 12:
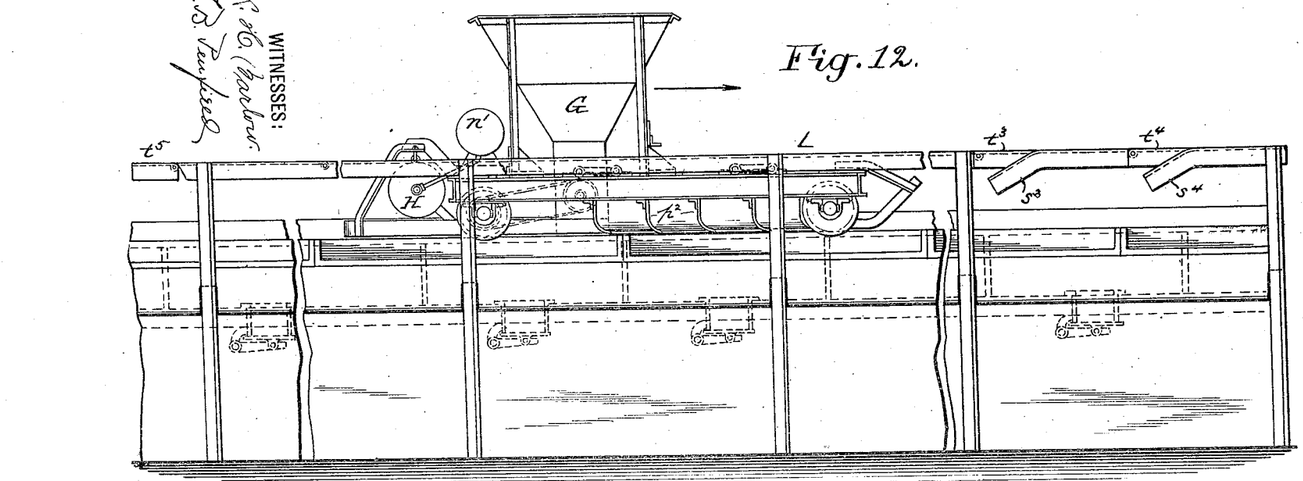
Fig. 12 represents, partly broken away, a side elevation thereof.
Figure 13:
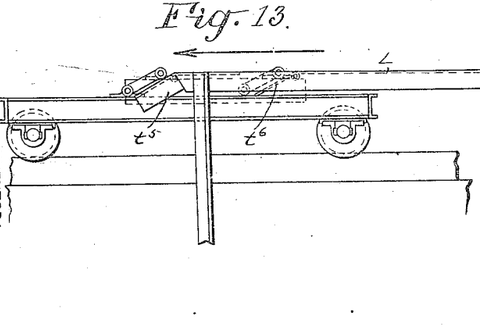
Figs. 13, 14, 15, 16 and 17 represent various details of construction hereinafter more fully set forth.
Figure 14:
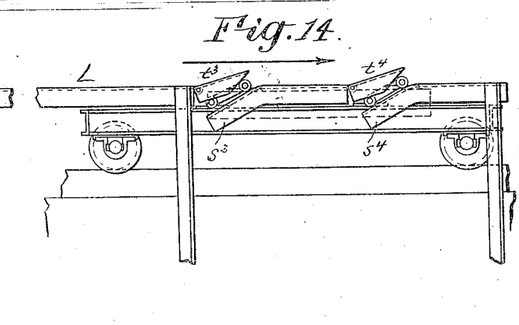
Figures 15, 16, 17:
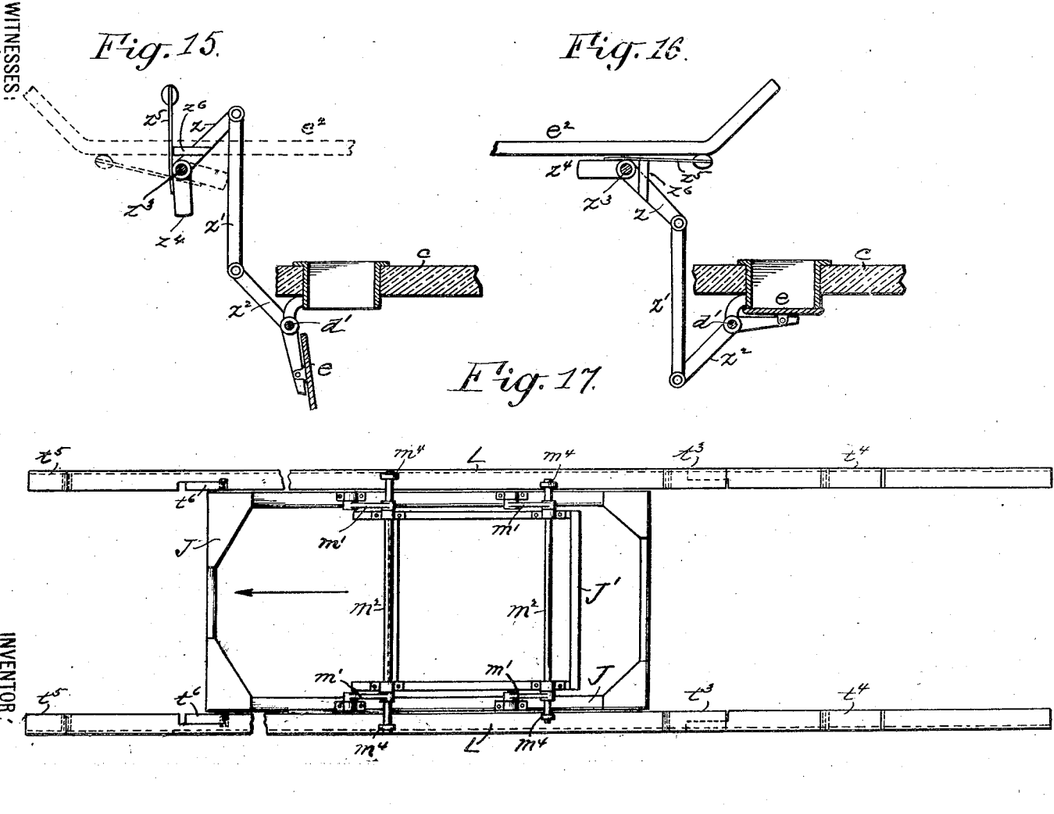

In the modification of the apparatus shown in Figs. 6 and 7, the same features of construction and operation are preserved as in the form of apparatus shown in the preceding figures with the exception that the driving gear for operating the revolving hopper and its adjuncts consists of an annular rack r supported upon pinions r', which are in turn actuated by a pinion r² on the power shaft E'. The rack r is attached to depending arms s from the frame l of the hopper, and these arms s are provided at their lower ends with wheels s' resting upon the annular track s². A similar pair of depending arms t provided at their lower ends with wheels t' run upon the trackway t², so that the frame l which carries the feed hopper and its adjuncts is so supported at both ends as to materially relieve the strain that would otherwise be put upon its bearings. The hopper I' which receives the completed product of the operation is provided with a discharge gate whose stem is provided with a wheel v mounted upon the trackway v', and, by making appropriate interruptions at a predetermined point or points in the trackway, the hopper I' may be automatically discharged at the place or places desired.

In order to still further illustrate the extent and scope of my invention, I have shown its broad features as embodied in a straight line furnace of the construction illustrated in Figs. 8 to 17 inclusive. In this furnace, the space beneath the grate surfaces f is, as before, preferably divided into an upper and a lower portion separated from each other by an intervening longitudinal arch c, the upper portion being likewise preferably divided up into individual compartments by the cross partitions d. So also, the arch c, as before, is provided with the valves e, adapted to be opened successively, as desired, either by hand or automatically, but preferably automatically as shown and as will be hereinafter more fully set forth. The traveling hopper G provided with the flutter wheel m for depositing the material to be treated in a regular layer of substantially uniform thickness upon the grate surface is, in this instance, supported upon a wheeled truck j running along the edges of the border plates a, which, as shown, are provided with inner edges or flanges upon which the individual sections of the grate f are placed side by side, these sections being furthermore provided at their inner ends with upwardly projecting flange f², but being devoid of such flange at their outer ends. By this construction, the scrapers p² attached to the truck j are enabled to readily scrape the fully roasted or sintered material from the grate surface down the inclined shelf w' into the car X or other suitable receptacle. For this particular use, I prefer a car as X running upon a track adjoining the straight line furnace, inasmuch as such car can be moved on slowly corresponding to the slow movement of the truck j. It will, of course, be understood that the car with its traveling hopper G, igniting burner H, fuel supply tank n' and scrapers p² can be moved forward, in the direction indicated by the arrow, Fig. 12, by any suitable traction means provided for the purpose. As the car moves along, the flutter wheel m is caused to revolve by means of the endless belt gear shown in dotted lines in Fig. 12, with the result that the material is fed from the hopper in a substantially uniform layer and is thereupon ignited by the gas burner H, whereupon the completion of the combustion is effected, as in the other modifications of the invention, by means of a current of air drawn downwardly into the lower portion of the space beneath the grate and to a degree, in the several individual compartments of the upper portion, dependent upon the amount of opening of the valves e, at any particular time. I wish it to be distinctly understood, however, that as hereinbefore indicated, these valves may, in some instances, be entirely dispensed with, or they may be actuated in part or in whole by hand, instead of by automatic devices.

Figure 3:
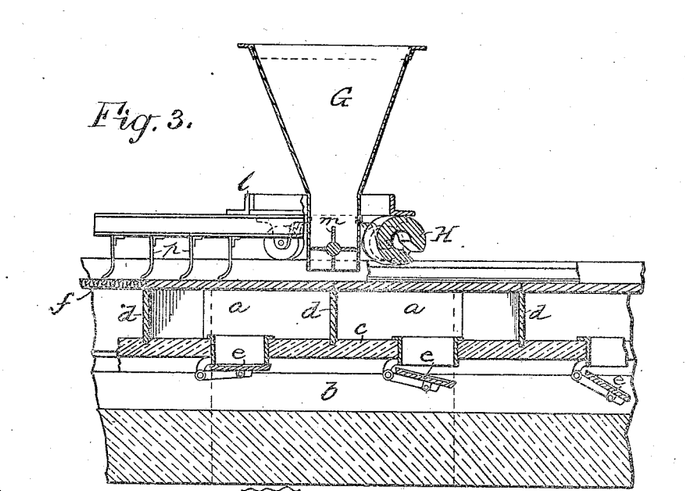
Figs. 3, 4 and 5 represent sectional views, on a somewhat larger scale, of certain details of the parts shown in Figs. 1 and 2.
Figure 4:
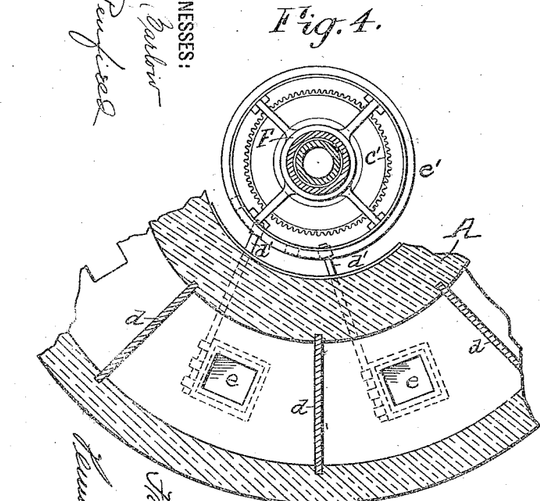
Figure 5:
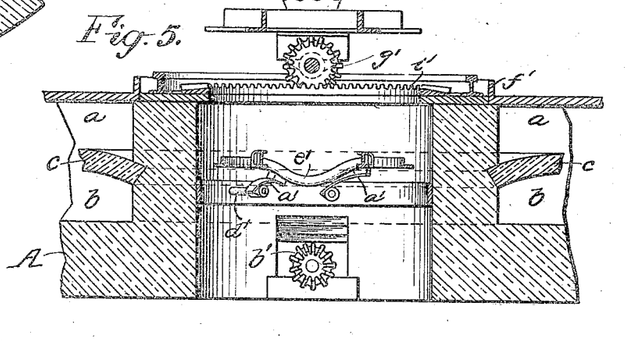

The particular device shown for automatically operating the valves in the straight line furnace consists of the levers z² fastened to the valve stem d' and the lever z fastened to the stub shaft z³, the said levers being connected by an intermediate link z'. The stub shaft z³ also carries an arm z⁴ free to turn thereon and provided with a spring projection z⁵ having at its end a button and adapted to coöperate with a projection z⁶ on the link z. The button of the spring arm is in the path of movement of a cam track e² attached to the truck j of the traveling hopper. When the advancing upturned end of the cam track encounters successively the buttons of the arms z⁵, the said arms are forced against the projections z⁶ and gradually close the valves e and hold them closed until the truck has passed, as shown, for instance in Figs. 11 and 16. As soon as the truck passes, the parts assume the position shown in Fig. 15, with the valve e open. On the return movement, when the cam track encounters an arm $z^5$ it swings that arm and the arm $z^4$ into the position shown in dotted lines in Fig. 15, without acting upon the valve. By this arrangement of parts, the valves, as before, are closed at that portion of the trackway where the finished product is discharged from the grate surface, but are left fully open at the place of ignition of the charge, so as to give it the entire benefit of the maximum admission of air at the latter point. It is of course obvious, that by varying the configuration of the cam track, appropriate variations can be made in the relative movement of the valves. In the straight line furnace, I have not considered it necessary to illustrate more than the full open position and the full closed position of the valves corresponding respectively to those grate sections wherein the charge is under full combustion and those wherein the combustion has practically ceased and the material is being discharged. In the annular furnace, however, as indicated in Fig. 3, the arrangement, as shown, is such that the valves are opened to varying degrees from the point of ignition onward.

At the termination of the forward movement of the traveling hopper, in a straight line furnace, it is obviously necessary to return to the starting point in order that it may begin a second operation corresponding to the first. To this end, it is necessary to raise the scrapers $p^2$, so that during the return movement of the truck J they may not interfere with the charge upon the grate. This may be conveniently effected by raising the supplemental frame J' which carries the scrapers, and suspending said frame, during the return movement of the hopper, upon the elevated trackways L. Accordingly the supplemental frame J' is attached to the main frame J of the truck by means of swinging links $m'$, and the frame J' is provided with transverse shafts or axles $m^2$ which carry at their outer ends the wheels $m^4$. As the truck approaches the extreme end of its forward travel, the wheels $m^4$ encounter downwardly projecting portions $s^3$, $s^4$ of the track L and mount the inclines thus provided. In mounting the inclines they swing upwardly pivoted portions $t^3$, $t^4$ of the said trackway L, until finally the supplemental frame is raised to the desired height, whereupon the rollers $m^4$ move out upon the level portions of the track L beyond the pivoted cross sections $t^3$, which track sections then drop back into their original position. The trackway L being thus reëstablished, the frame J' together with the scrapers $p^2$ remain suspended during the return movement of the truck, thereby keeping the scrapers out of contact with the ore body during the return movement, and, at the termination of the return movement, as indicated more fully in Fig. 13, the wheels or rollers $m^4$ slide down similar inclines $t^5$, $t^6$, at the end of the trackway L, thereupon resuming their original position, whereupon the inclines $t^5$, $t^6$, which are normally held in their upper position by means of springs or the like, rise again to the level of the main trackway L, thereby permitting the forward travel of the car during its next advance with the scrapers in their lowered position.

Having thus described my invention, what I claim is:

1. Apparatus for calcining, desulfurizing, agglomerating, and sintering ores and like materials, provided with a stationary grate upon which the material may be placed and ignited, a traveling hopper movable along the grate's surface and adapted to deposit the layer of material thereon, and means for passing air through the material to maintain its combustion after ignition; substantially as described.

2. Apparatus for calcining, desulfurizing, agglomerating, and sintering ores and like materials, provided with a stationary grate upon which the material may be placed and ignited, a traveling hopper movable along the grate's surface and adapted to deposit the layer of material thereon, an igniting burner carried by the hopper, and movable therewith, and means for passing air through the material to maintain its combustion after ignition; substantially as described.

3. Apparatus for calcining, desulfurizing, agglomerating, and sintering ores and like materials, provided with a stationary grate upon which the material may be placed and ignited, a traveling hopper movable along the grate's surface and adapted to deposit the layer of material thereon, an igniting burner carried by the hopper, and movable therewith, a scraper likewise carried by the hopper and movable therewith for sweeping the finished product from the grate's surface, and means for passing air through the material to maintain its combustion after ignition; substantially as described.

4. Apparatus for calcining, desulfurizing, agglomerating and sintering ores and like materials, provided with a stationary annular grate upon which the material is to be placed, a hopper for feeding the layer of material upon the grate's surface, said hopper being provided with means for causing it to move in a continuous rotary path along the grate's surface, an igniting burner traveling with the hopper, a scraper likewise traveling with the hopper, and means for causing a current of air to pass through the material after its ignition; substantially as described.

5. Apparatus for calcining, desulfurizing, agglomerating, and sintering ores and like materials, provided with a stationary annular grate upon which the material is to be placed, a hopper for feeding the layer of material upon the grate's surface, said hopper being provided with means for causing it to move in a continuous rotary path along the grate's surface, an igniting burner traveling with the hopper, a scraper likewise traveling with the hopper, and means for causing a current of air to pass through the material after its ignition, said means consisting of an exhauster for causing a down draft through the material, and provisions for varying the strength of the draft at different places along the grate; substantially as described.

6. Apparatus for calcining, desulfurizing, agglomerating, and sintering ores and like materials, provided with a stationary grate surface upon which the material may be placed, a traveling feed hopper for supplying the layer of material to the grate's surface, a scraper for sweeping the finished product from the grate's surface, an outlying receiving bin or receptacle in which the finished product is collected, and means for causing a current of air to pass through the material maintaining its combustion after ignition, substantially as described.

7. In apparatus for calcining, desulfurizing, agglomerating, and sintering ores and like materials, a furnace structure consisting of annular walls separated from each other by an intervening annular space, a stationary grate covering said space and having a substantially flat upper surface, a feed hopper coöperating with the grate and movable with respect thereto, and an outlying receiving bin or receptacle for the finished product; substantially as described.

8. In apparatus for calcining, desulfurizing, agglomerating, and sintering ores and like materials, a furnace structure consisting of annular walls separated from each other by an intervening space, a stationary annular grate covering said space and having a substantially smooth upper surface, the inner annular wall inclosing a central well space, a column or pedestal located within the well space, a frame carried by the pedestal and revoluble thereon, a feed hopper carried by said frame for depositing the layer of material on the grate, and an outlying receiving bin for collecting the finished product substantially as described.

9. In apparatus for calcining, desulfurizing, agglomerating, and sintering ores and like materials, a furnace structure provided with two annular walls, inclosing an inner well space, a grate upon which the material to be treated is to be placed, said grate covering the annular space referred to, an arch dividing the annular space longitudinally into an upper and lower portion, the upper portion being divided into individual compartments, valve openings between the individual compartments and the lower portion of the annular space, an exhauster connected with the lower portion of the annular space and means for varying the amount to which the several valves are opened during the operation of the furnace; substantially as described.

10. In apparatus for calcining, desulfurizing, agglomerating, and sintering ores and like materials, a furnace structure provided with two annular walls, inclosing an inner well space, a grate upon which the material to be treated is to be placed, said grate covering the annular space referred to, an arch dividing the annular space longitudinally into an upper and lower portion, the upper portion being divided into individual compartments, valve openings between the individual compartments and the lower portion of the annular space, an exhauster connected with the lower portion of the annular space, and means for varying the amount to which the several valves are opened during the operation of the furnace, said means consisting of actuating stems passing through the inner annular wall into the well space, and a cam track acting upon the several valve stems successively; substantially as described.

In testimony whereof I affix my signature, in presence of two witnesses.

FRANCIS D. WEEKS.

Witnesses:
R. I. DENISTON,
A. E. FILSON.